US010299222B2

(12) United States Patent
Chen et al.

(10) Patent No.: US 10,299,222 B2
(45) Date of Patent: May 21, 2019

(54) METHOD, APPARATUS AND STORING MEDIA FOR POWER CONTROL (71) Applicant: ZTE CORPORATION, Guangdong (CN)

(72) Inventors: Lin Chen, Guangdong (CN); Fang Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/513,751

(22) PCT Filed: Mar. 2, 2015

(86) PCT No.: PCT/CN2015/073525
§ 371 (c)(1),
(2) Date: Mar. 23, 2017

(87) PCT Pub. No.: WO2016/045317
PCT Pub. Date: Mar. 31, 2016

(65) Prior Publication Data
US 2017/0295548 A1 Oct. 12, 2017

(30) Foreign Application Priority Data

Sep. 23, 2014 (CN) .......................... 2014 1 0491599

(51) Int. Cl.
H04W 52/26 (2009.01)
H04W 24/10 (2009.01)
(Continued)

(52) U.S. Cl.
CPC ........... *H04W 52/26* (2013.01); *H04W 24/10* (2013.01); *H04W 52/143* (2013.01);
(Continued)

(58) Field of Classification Search
CPC ..... H04W 24/02; H04W 24/10; H04W 52/04; H04W 52/143; H04W 52/246; H04W 52/26; H04W 52/367
(Continued)

(56) References Cited

U.S. PATENT DOCUMENTS

2010/0273518 A1* 10/2010 Suzuki ................ H04W 52/225
455/522
2014/0155085 A1* 6/2014 Kosseifi ................ H04W 24/10
455/456.1
(Continued)

FOREIGN PATENT DOCUMENTS

CN 101674600 A 3/2010
CN 103139881 A 6/2013
(Continued)

OTHER PUBLICATIONS

International Search Report dated Jun. 19, 2015 issued in PCT/CN2015/073525.

*Primary Examiner* — Mark H Rinehart
*Assistant Examiner* — Kokou R Detse
(74) *Attorney, Agent, or Firm* — Scully Scott Murphy & Presser (57) ABSTRACT A method for power control includes: setting a transmission power for a small cell; determining periodically, when the small cell is operated with a low transmission power, whether a Reference Signal Receiving Quality RSRQ value corresponding to a User Equipment UE with worst channel quality in a serving cell is less than a preset RSRQ threshold; and augmenting the transmission power by a step value when the RSRQ value is less than the preset RSRQ threshold.

9 Claims, 3 Drawing Sheets (51) Int. Cl.
- *H04W 52/38* (2009.01)
- *H04W 52/14* (2009.01)
- *H04W 52/24* (2009.01)
- *H04W 52/36* (2009.01)
- *H04W 24/02* (2009.01)
- *H04W 52/04* (2009.01)
- *H04W 52/28* (2009.01)
- *H04W 52/34* (2009.01)

(52) U.S. Cl.
CPC ....... *H04W 52/245* (2013.01); *H04W 52/246* (2013.01); *H04W 52/367* (2013.01); *H04W 52/38* (2013.01); *H04W 24/02* (2013.01); *H04W 52/04* (2013.01); *H04W 52/283* (2013.01); *H04W 52/343* (2013.01); *Y02D 70/00* (2018.01)

(58) Field of Classification Search
USPC .......................................................... 370/318
See application file for complete search history.

(56) References Cited

U.S. PATENT DOCUMENTS

2014/0204765 A1\* 7/2014 Chai ..................... H04L 5/0073 370/241.1
2014/0335881 A1\* 11/2014 Rubin ................... H04W 28/20 455/452.1

FOREIGN PATENT DOCUMENTS

| CN | 103596254 A | 2/2014 |
| CN | 103906076 A | 7/2014 |
| CN | 103916901 A | 7/2014 |

\* cited by examiner

METHOD, APPARATUS AND STORING MEDIA FOR POWER CONTROL

CROSS-REFERENCE TO RELATED APPLICATIONS

This application is the 371 application of PCT Application No. PCT/CN2015/073525 filed Mar. 2, 2015, which is based upon and claims priority to Chinese Patent Application No. 201410491599.3, filed Sep. 23, 2014, the entire contents of which are incorporated herein by reference.

TECHNICAL FIELD

The present application relates to technology field of mobile communication, and more particularly to a method and an apparatus for power control in infrastructure sharing as well as a storage medium.

BACKGROUND

In order to significantly increase the network system capacity, hundreds of small base station (Small Cell) can be deployed within each macro cell coverage under the 5G (5th Generation Telecommunication) scenario. Under infrastructure sharing, the network deployment consists of small cell that are not deployed without plan by a user or an operator. The entire infrastructure may be made up of buildings, and small cells are randomly distributed within the buildings. All small cells in the network deployment may adopt an access mode of "open/hybrid", where the small cells may be accessed openly and simultaneously by indoor users, outdoor users and the entire neighborhood. In the infrastructure sharing, since the deployment of small cells requires site resources, backhaul resources, spectrum resources and the like, while taking into account the high cost of deploying small cells in the outdoors, it is desired to enable the indoor deployment to achieve coverage of both indoor and outdoor.

However, as the overall network system capacity is improved through ultra-dense deployment of indoor small cells, users are faced with new challenges in terms of interference, mobility and energy efficiency. With ultra-dense deployment in geographic space and equal transmission intensity, coverage of each small cell is much smaller than that of the macro cell, resulting in frequent switching of the moving UE (user equipment) between small cells in the scenario. Accordingly, as one of KPIs (key performance indicators), the switching success rate is greatly impacted, and serious pilot pollution and energy waste may be caused.

In summary, it has become an urgent problem to be solved in the infrastructure sharing to provide a power control method to enhance the user experience.

This section provides background information related to the present disclosure which is not necessarily prior art.

SUMMARY

In view of above, embodiments of the disclosure are intended to provide a method and an apparatus for power control as well as a storage medium, which can effectively reduce the pilot pollution, improve the user experience, and achieve the purpose of energy saving while remaining or even slightly improving throughput capacity on UE.

In order to achieve the above object, the technical solution of the present disclosure is implemented as follows.

There is provided a method for power control according to an embodiment of the disclosure, including:
setting a transmission power for a small cell;
determining periodically, when the small cell is operated with a low transmission power, whether an RSRQ (Reference Signal Receiving Quality) value corresponding to a UE (User Equipment) with worst channel quality in a serving cell is less than a preset RSRQ threshold; and augmenting the transmission power by a step value when the RSRQ value is less than the preset RSRQ threshold.

In the solution described above, prior to the setting a transmission power for a small cell, the method includes: acquiring a maximum RSRP (Reference Signal Receiving Power) value of a neighboring cell and a serving cell load.

In the solution described above, the setting a transmission power for a small cell includes:
setting a high transmission power for the small cell when the maximum RSRP value of the neighboring cell is less than a preset RSRP threshold and/or when the serving cell load is greater than or equal to a preset cell load threshold;
determining, when the maximum RSRP value of the neighboring cell is greater than or equal to the preset RSRP threshold and when the serving cell load is less than the preset cell load threshold, whether an outdoor UE is present in the serving cell; setting a high transmission power for the small cell if an outdoor UE is present, and setting a low transmission power for the small cell if no outdoor UE is present.

In the solution described above, the determining whether an outdoor UE is present in the serving cell includes:
acquiring IMSIs (International Mobile Subscriber Identities) of all indoor UEs in the serving cell and IMSIs of activated UEs in the serving cell; and determining an activated UE with an IMSI not presented in the IMSIs of all indoor UEs as an outdoor UE, and determining an activated UE with an IMSI presented in the IMSIs of all indoor UEs as an indoor UE.

In the solution described above, the determining periodically whether an RSRQ value corresponding to a UE with worst channel quality in a serving cell is less than a preset RSRQ threshold includes:
collecting periodically RSRQ values of UEs in the serving cell to acquire the RSRQ value corresponding to the UE with worst channel quality; and determining by comparison whether the RSRQ value corresponding to the UE with worst channel quality is less than the preset RSRQ threshold.

There is also provided an apparatus for power control according to an embodiment of the disclosure, including a setting module and a processing module; wherein
the setting module is configured to set a transmission power for a small cell;
the processing module is configured to determine periodically, when the small cell is operated with a low transmission power, whether a Reference Signal Receiving Quality RSRQ value corresponding to a User Equipment UE with worst channel quality in a serving cell is less than a preset RSRQ threshold; and to augment the transmission power by a step value when the RSRQ value is less than the preset RSRQ threshold.

In the solution described above, the apparatus further includes an acquiring module configured to acquire a maximum RSRP value of a neighboring cell and a serving cell load.

In the solution described above, the setting module is further configured to: set a high transmission power for the small cell when the maximum RSRP value of the neighboring cell is less than a preset RSRP threshold and/or when the serving cell load is greater than or equal to a preset cell load threshold;

determine, when the maximum RSRP value of the neighboring cell is greater than or equal to the preset RSRP threshold and when the serving cell load is less than the preset cell load threshold, whether an outdoor UE is present in the serving cell; and set a high transmission power for the small cell if an outdoor UE is present, and set a low transmission power for the small cell if no outdoor UE is present.

In the solution described above, the setting module is further configured to: acquire IMSIs of all indoor UEs in the serving cell and IMSIs of activated UEs in the serving cell; and determine an activated UE with an IMSI not presented in the IMSIs of all indoor UEs as an outdoor UE, and determine an activated UE with an IMSI presented in the IMSIs of all indoor UEs as an indoor UE.

In the solution described above, the processing module is further configured to collect periodically, when the small cell is operated with the low transmission power, RSRQ values of UEs in the serving cell to acquire the RSRQ value corresponding to the UE with worst channel quality; and determine by comparison whether the RSRQ value corresponding to the UE with worst channel quality is less than the preset RSRQ threshold.

There is also provided a non-transitory computer-readable storage medium having stored therein instructions that, when executed by a processor of a small cell, causes small cell to perform the method for power control according to the embodiment of the disclosure.

According to the method and the apparatus for power control as well as the storage medium provided by the embodiments of the disclosure, a transmission power is set by a small cell; it is determined periodically, when the small cell is operated with a low transmission power, whether an RSRQ value corresponding to a UE with the worst channel quality in a serving cell is less than a preset RSRQ threshold; and the transmission power is augmented by a certain step value when the RSRQ value is less than the preset RSRQ threshold. In this way, by setting the transmission power for the small cells, some small cells are operated with a low transmission power, while some others are operated with in a high transmission power, thus effectively reducing the pilot pollution, avoiding frequent switching of UE under an intensive deployment of small cells. Moreover, the purpose of energy saving can be effectively achieved while remaining or even slightly improving throughput of UEs. The user's demand for transmission power of small cells can be further met by adjusting step value of the transmission power, such that user experience can be improved.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are provided for further understanding the technical solution of the present application and which form a part of the specification, are used in conjunction with the embodiments of the present application to explain the technical solution of the present application and do not constitute a limitation on the technical scope of the present application.

DETAILED DESCRIPTION

For further clarifying the purpose, technical solution and advantages of the present application, the embodiments of the present application will be described in detail hereinafter with reference to the accompanying drawings. It is to be noted that the features of the embodiments and examples in the present application may be combined with each other without conflict.

In an embodiment of the disclosure, a transmission power is set by a small cell; it is determined periodically, when the small cell is operated with a low transmission power, whether an RSRQ value corresponding to a UE with the worst channel quality in a serving cell is less than a preset RSRQ threshold; and the transmission power is augmented by a certain step value when the RSRQ value is less than the preset RSRQ threshold.

Figure 1:
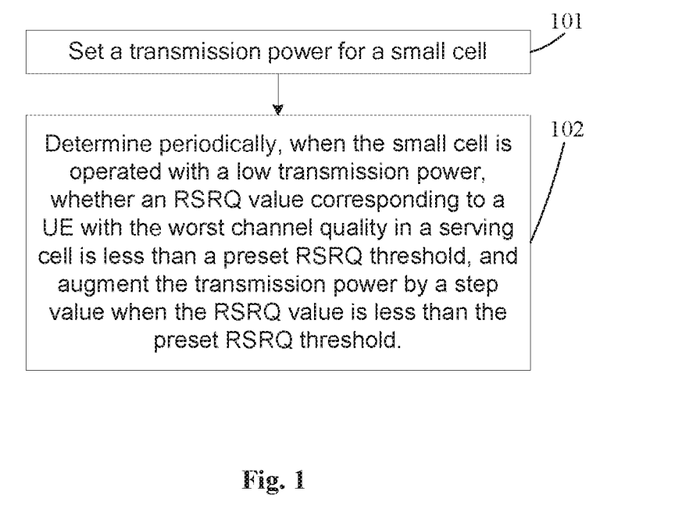
FIG. 1 is a flow chart illustrating a method for power control according to Embodiment I of the disclosure.

FIG. 1 is a flow chart illustrating a method for power control according to Embodiment I of the disclosure. As shown in FIG. 1, the method for power control according to the embodiment includes following steps.

In step 101, a transmission power is set by a small cell.

Prior to this step, the method may further include acquiring a maximum RSRP value of a neighboring cell and a serving cell load.

In an embodiment, the RSRP value of the neighboring cell is acquired by measuring the pilot power of all the small cells in the neighboring cell, and calculating the maximum RSRP value from all the small cells in the neighboring cell according to the measured pilot power.

The serving cell load may be acquired by obtaining the occupancy rate of PRB (Physical Resource Block) of the serving cell or the number of active UEs in the serving cell. In other words, the serving cell load may be represented either by the occupancy rate of PRB of the serving cell, or by the number of active UEs in the serving cell. The smaller the number of active UEs, the lower the load of the serving cell.

In an embodiment of the present disclosure, the maximum RSRP value of the neighboring cell and the serving cell load are acquired periodically, the transmission power is also periodically set, and the acquisition may be performed in the same cycle as the setting. In an embodiment, the period falls within a range of 1 hour to 5 hours and, for example, may be 1 hour.

In an embodiment, the transmission power is set by the small cell through: setting a high transmission power $P_{max}$ for the small cell when the maximum RSRP value of the neighboring cell is less than a preset RSRP threshold RsrpThrd and/or when the serving cell load is greater than or equal to a preset cell load threshold LoadThrd; and determining, when the maximum RSRP value of the neighboring cell is greater than or equal to the preset RSRP threshold and when the serving cell load is less than the preset cell load threshold, whether an outdoor UE is present in the serving cell; and setting a high transmission power for the small cell if an outdoor UE is present, and setting a low transmission power $P_{min}$ for the small cell if no outdoor UE is present.

In an embodiment, the high transmission power $P_{max} \in$ [20 dBm, 23 dBm] and, for example, $P_{max}$ is 20 dBm.

In an embodiment, the low transmission power $P_{min} \in$ [−10 dBm, 15 dBm] and, for example, $P_{min}$ is 0 dBm.

In an embodiment, the preset RSRP threshold RsrpThrd $\in$ [−100 dBm, −45 dBm].

When the serving cell load is represented by the number of active UEs in the serving cell, the preset cell load threshold LoadThrd $\in$ [1, 20] and, in an embodiment, LoadThrd is 1.

In an embodiment, it is determined whether an outdoor UE is present in the serving cell by:

acquiring IMSIs of all indoor UEs in the serving cell and IMSIs of active UEs in the serving cell; and determining an activated UE with an IMSI not presented in the IMSIs of all indoor UEs as an outdoor UE, and determining an activated UE with an IMSI presented in the IMSIs of all indoor UEs as an indoor UE.

In an embodiment, the IMSIs of active UEs in the serving cell are acquired by the small cell based on registration information of the active UEs and signaling communication with the UEs.

In step 102, it is determined periodically, when the small cell is operated with a low transmission power, whether a RSRQ (Reference Signal Receiving Quality) value corresponding to a UE with the worst channel quality in the serving cell is less than a preset RSRQ threshold RsrqThrd; and the transmission power is augmented by a certain step value when the RSRQ value is less than the preset RSRQ threshold.

In an embodiment, the period ranges from 30 seconds to 100 seconds and, for example, is 60 second.

The preset RSRQ threshold RsrqThrd $\in$ [−20 dBm, −10 dBm] and, in an embodiment, RsrqThrd is −16 dB.

The step value may include one or more steps. In an embodiment, one step falls within a range of (1 dB, 3 dB) and, for example, may be 2 dB.

This step may be performed by periodically collecting, when the small cell is operated with a low transmission power, RSRQ values of UEs in the serving cell to acquire the RSRQ value corresponding to the UE with the worst channel quality; and determining by comparison whether the RSRQ value corresponding to the UE with the worst channel quality is less than the preset RSRQ threshold. In this way, in consideration of the case corresponding to the UE with the worst channel quality in the serving cell, the call quality of each UE can be ensured, and complaints caused by the deterioration of the service quality of the indoor UE may be avoided.

In an embodiment, the small cell is determined to be operated with the low transmission power when determining that the maximum RSRP value of neighbor cells is greater than or equal to the preset RSRP threshold, the serving cell load is less than the preset cell load threshold and no outdoor UE is present in the serving cell.

RSRQ values of UEs in the serving cell may be collected periodically by sending periodic measurement control messages to all the UEs in the serving cell and periodically collecting the measurement report reported by the UEs in the serving cell, or from other relevant measurement reports of the UEs in the serving cell.

Figure 2:
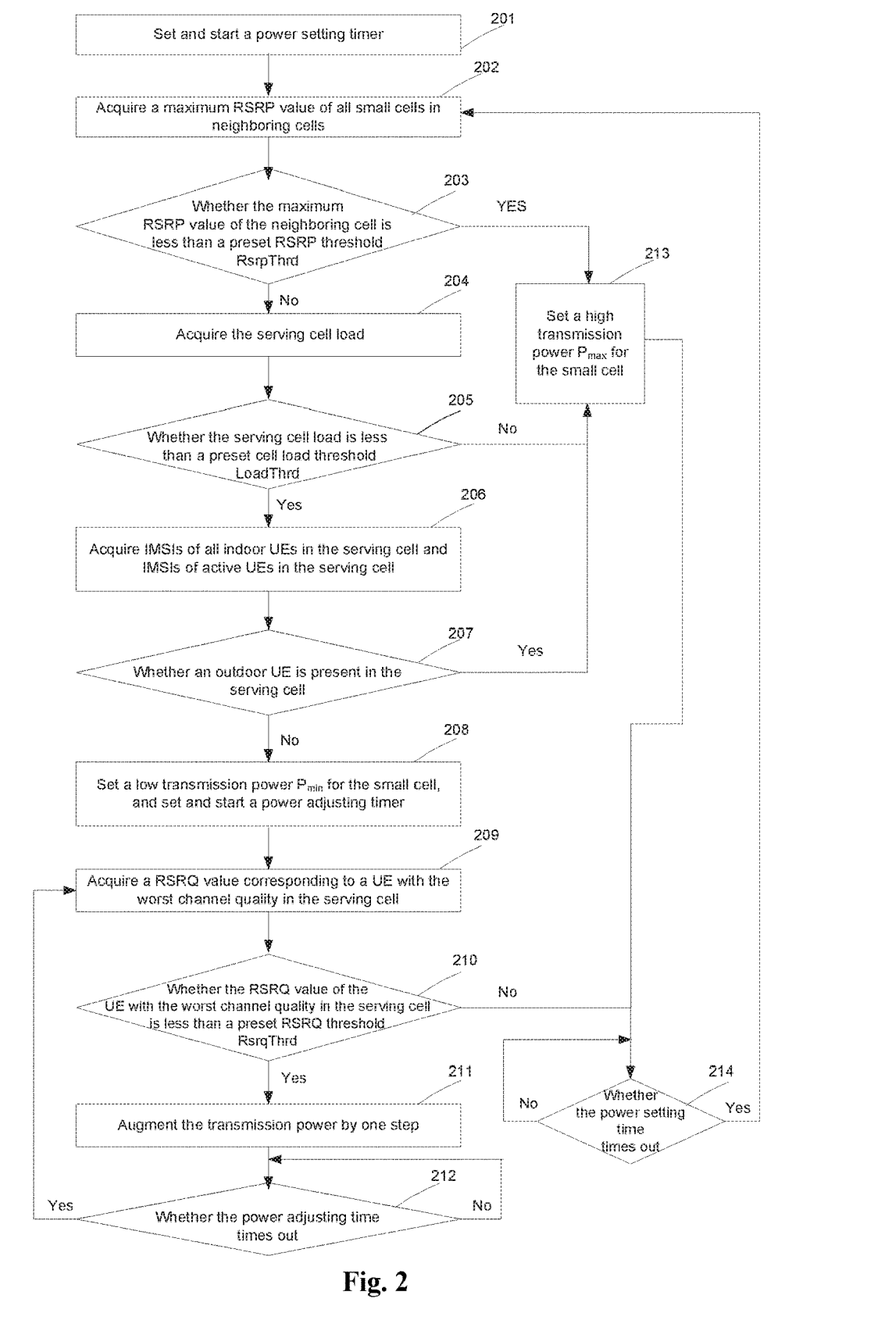
FIG. 2 is a flow chart illustrating a method for power control according to Embodiment II of the disclosure.

FIG. 2 is a flow chart illustrating a method for power control according to Embodiment II of the disclosure. As shown in FIG. 2, the method for power control according to the embodiment includes following steps.

In step 201, a power setting timer is set and started.

Herein, a duration of the power setting timer may fall within a range of (1 hour, 5 hours) and, in the embodiment of the present disclosure, is 1 hour.

In step 202, a maximum RSRP value of all small cells in neighboring cells is acquired.

This step may be performed by measuring the pilot power of all the small cells in the neighboring cells, and calculating the maximum RSRP value from all the small cells in the neighboring cells according to the measured pilot power.

In step 203, it is determined whether the maximum RSRP value of the neighboring cell is less than a preset RSRP threshold RsrpThrd. If yes, step 213 is performed; and if no, step 204 is performed.

The preset RSRP threshold RsrpThrd may fall within a range of [−100 dBm, −45 dBm], and in the embodiment, is −60 dBm.

In step 204, the serving cell load is acquired.

Herein, the serving cell load may be represented either by the occupancy rate of PRB of the serving cell, or by the number of active UEs in the serving cell. The smaller the number of active UEs, the lower the load of the serving cell. In the embodiment, the serving cell load is represented by the number of active UEs in the serving cell.

In step 205, it is determined whether the serving cell load is less than a preset cell load threshold LoadThrd; if yes, step 206 is performed; and if not, step 213 is performed.

Herein, the preset cell load threshold LoadThrd may fall within a range of [1, 20] and, in the embodiment, is 1.

In another embodiment, the serving cell load may be acquired first and it is determined whether the serving cell load is less than the preset cell load threshold LoadThrd. If no, step 214 is performed; and if yes, the maximum RSRP value of all the small cells in the neighboring cell is acquired and it is determined whether the maximum RSRP value of the neighboring cell is less than the preset RSRP threshold RsrpThrd. If yes, step 214 is performed; and if no, step 206 is performed.

In step 206, IMSIs of all indoor UEs in the serving cell and IMSIs of active UEs in the serving cell are acquired.

Herein, the IMSIs of active UEs in the serving cell may be acquired by the small cell based on registration information of the active UEs and signaling communication with the UEs.

In step 207, it is determined whether an outdoor UE is present in the serving cell; if yes, step 213 is performed; and if no, step 208 is performed.

This step may be performed, according to the acquired IMSIs of all indoor UEs in the serving cell and IMSIs of active UEs in the serving cell, by determining an activated UE with an IMSI not presented in the IMSIs of all indoor UEs as an outdoor UE, and determining an activated UE with an IMSI presented in the IMSIs of all indoor UEs as an indoor UE.

In step 208, the low transmission power $P_{min}$ is set for the small cell, and a power adjusting timer is set and started.

Herein, the low transmission power $P_{min}$ may fall within a range of [−10 dBm, 15 dBm] and, in the embodiment, $P_{min}$ is 0 dBm.

A duration of the power adjusting timer may fall within a range of (20 seconds, 300 seconds) and, in the embodiment of the present disclosure, is 60 seconds.

In step 209, a RSRQ value corresponding to a UE with the worst channel quality in the serving cell is acquired.

This step may be performed by the small cell through collecting measurement reports reported by the UEs in the serving cell to obtain RSRQ values of UEs in the serving cell and, thus, acquiring the RSRQ value of the UE with the worst channel quality in the serving cell.

In step 210, it is determined whether the RSRQ value corresponding to the UE with the worst channel quality in the serving cell is less than a preset RSRQ threshold RsrqThrd; if yes, step 211 is performed; and if no, step 214 is performed.

Herein, the preset RSRQ threshold RsrqThrd may fall within a range of [−20 dBm, −10 dBm] and, in the embodiment, RsrqThrd is −16 dB.

In step 211, the transmission power is augmented by a certain step value.

In the embodiment of the disclosure, the step value includes one step which falls within a range of (1 dB, 3 dB) and, in the embodiment, is 2 dB.

In step 212, it is determined whether the power adjusting time times out; if yes, step 209 is performed; and if no, step 212 is performed.

In step 213, the high transmission power $P_{max}$ is set for the small cell, and step 214 is performed.

Herein, the high transmission power $P_{max}$ may fall within a range of [20 dBm, 23 dBm] and, in the embodiment, $P_{max}$ is 20 dBm.

In step 214, it is determined whether the power setting time times out; if yes, step 202 is performed; and if no, step 214 is performed.

Figure 3:
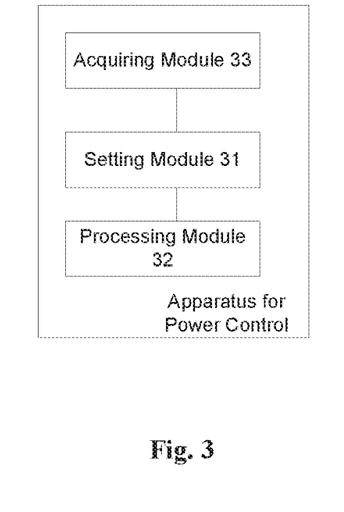
FIG. 3 is a block diagram illustrating an apparatus for power control according to an embodiment of the disclosure.

FIG. 3 is a block diagram illustrating an apparatus for power control according to an embodiment of the disclosure. As shown in FIG. 3, the apparatus for power control according to embodiments of the disclosure includes a setting module 31 and a processing module 32. Herein, the setting module 31 is configured to set a transmission power for a small cell;

the processing module 32 is configured to determine periodically, when the small cell is operated with a low transmission power, whether an RSRQ value corresponding to a UE with the worst channel quality in a serving cell is less than a preset RSRQ threshold; and to augment the transmission power by a certain step value when the RSRQ value is less than the preset RSRQ threshold.

In an embodiment, the apparatus further includes an acquiring module 33 configured to acquire a maximum RSRP value of a neighboring cell and a serving cell load.

Herein, the acquiring module 33 may acquire the maximum RSRP value of the neighboring cell by measuring the pilot power of all the small cells in the neighboring cell, and calculating the maximum RSRP value from all the small cells in the neighboring cell according to the measured pilot power.

Moreover, the acquiring module 33 may acquire the serving cell load by obtaining the occupancy rate of PRB of the serving cell or the number of active UEs in the serving cell. In other words, the serving cell load may be represented either by the occupancy rate of PRB of the serving cell, or by the number of active UEs in the serving cell. The smaller the number of active UEs, the lower the load of the serving cell.

In an embodiment of the present disclosure, the maximum RSRP value of the neighboring cell and the serving cell load are acquired periodically by the acquiring module 33, the transmission power is also periodically set by the setting module 31, and the acquisition may be performed in the same cycle as the setting. In an embodiment, the period falls within a range of 1 hour to 5 hours and, for example, may be 1 hour.

In an embodiment, the transmission power is set by the setting module 31 through: setting a high transmission power $P_{max}$ for the small cell when the maximum RSRP value of the neighboring cell is less than a preset RSRP threshold RsrpThrd and/or when the serving cell load is greater than or equal to a preset cell load threshold LoadThrd; and determining, when the maximum RSRP value of the neighboring cell is greater than or equal to the preset RSRP threshold and when the serving cell load is less than the preset cell load threshold, whether an outdoor UE is present in the serving cell; and setting the high transmission power $P_{max}$ for the small cell if an outdoor UE is present, and setting a low transmission power $P_{min}$ for the small cell if no outdoor UE is present.

In an embodiment, the high transmission power $P_{max} \in$ [20 dBm, 23 dBm] and, for example, $P_{max}$ is 20 dBm.

In an embodiment, the low transmission power $P_{min} \in$ [−10 dBm, 15 dBm] and, for example, $P_{min}$ is 0 dBm.

In an embodiment, the preset RSRP threshold RsrpThrd $\in$ [−100 dBm, −45 dBm].

When the serving cell load is represented by the number of active UEs in the serving cell, the preset cell load threshold LoadThrd $\in$ [1, 20] and, in an embodiment, LoadThrd is 1.

In an embodiment, the setting module 31 determines whether an outdoor UE is present in the serving cell by acquiring IMSIs of all indoor UEs in the serving cell and IMSIs of active UEs in the serving cell; determining an activated UE with an IMSI not presented in the IMSIs of all indoor UEs as an outdoor UE, and determining an activated UE with an IMSI presented in the IMSIs of all indoor UEs as an indoor UE.

In an embodiment, the setting module 31 acquires the IMSIs of active UEs in the serving cell through registration information of the active UEs and signaling communication with the UEs.

In an embodiment, the processing module 32 periodically obtains the RSRQ value of the UE with the worst channel quality in the serving cell by periodically collecting RSRQ values of UEs in the serving cell to acquire the RSRQ value corresponding to the UE with the worst channel quality; and determining by comparison whether the RSRQ value corresponding to the UE with the worst channel quality is less than the preset RSRQ threshold RsrqThrd.

The processing module 32 may determine that the small cell is operated with the low transmission power when determining that the maximum RSRP value of neighbor cells is greater than or equal to the preset RSRP threshold, the serving cell load is less than the preset cell load threshold and no outdoor UE is present in the serving cell.

In an embodiment, the period ranges from 30 seconds to 100 seconds and, for example, is 60 second.

The preset RSRQ threshold RsrqThrd $\in$ [−20 dBm, −10 dBm] and, in an embodiment, RsrqThrd is −16 dB.

The processing module 32 may periodically collect the RSRQ values of UEs in the serving cell by sending periodic measurement control messages to all the UEs in the serving cell and periodically collecting the measurement report reported by the UEs in the serving cell, or from other relevant measurement reports of the UEs in the serving cell.

In an embodiment, the certain step value includes one or more steps. Herein, the one step may fall within a range of (1 dB, 3 dB) and, in an embodiment, is 2 dB.

The setting module, the processing module and the acquiring module in the apparatus for power control according to the embodiments of the disclosure can be realized by a processor, or can be realized by a specific logic circuit. Herein, the processor may be provided in a mobile terminal or a server. As an implementation, the processor may be a CPU (Central Processing Unit), an MPU (microprocessor), a DSP (digital signal processor), an FPGA (field programmable gate array) or the like.

In the embodiments of the present disclosure, the method for power control may be implemented in the form of a software function module and can be sold or used as a stand-alone product, or it may be stored in a computer-readable storage medium. Based on this understanding, the technical solution of the embodiment of the present disclosure, in essence, or in the form of a contribution to the prior art, may be embodied in the form of a software product stored in a storage medium including a number of instructions, such that a computer device (which may be a personal computer, a server, a network device or the like.) performs all or part of the method described in the various embodiments of the present disclosure. The storage medium may include a USB disk, a removable hard disk, a ROM (read only memory), a magnetic disk, an optical disk, and the like, which can store program code. Thus, embodiments of the present disclosure are not limited to any particular combination of hardware and software.

Accordingly, an embodiment of the present disclosure further provides a computer storage medium storing a computer program executed for implementing the above-described method for power control according to embodiments of the present invention.

The foregoing is merely a preferred embodiment of the present disclosure and is not intended to limit the scope of the invention.

What is claimed is:

1. A method for power control, comprising:
   acquiring a maximum Reference Signal Receiving Power RSRP value of a neighboring cell and a serving cell load;
   setting a transmission power for a small cell;
   determining periodically, when the small cell is operated with a low transmission power, whether a Reference Signal Receiving Quality RSRQ value corresponding to a User Equipment UE with worst channel quality in a serving cell is less than a preset RSRQ threshold; and
   augmenting the transmission power by a step value when the RSRQ value is less than the preset RSRQ threshold,
   wherein the setting a transmission power for a small cell comprises:
   determining, when the maximum RSRP value of the neighboring cell is greater than or equal to a preset RSRP threshold and when the serving cell load is less than a preset cell load threshold, whether an outdoor UE is present in the serving cell; and
   setting a low transmission power for the small cell if no outdoor UE is present.

2. The method according to claim 1, wherein the setting a transmission power for a small cell further comprises:
   setting a high transmission power for the small cell when the maximum RSRP value of the neighboring cell is less than the preset RSRP threshold and/or when the serving cell load is greater than or equal to the preset cell load threshold;
   and
   setting a high transmission power for the small cell if an outdoor UE is present.

3. The method according to claim 2, wherein the determining whether an outdoor UE is present in the serving cell comprises:
   acquiring International Mobile Subscriber Identities IMSIs of all indoor UEs in the serving cell and IMSIs of activated UEs in the serving cell; and
   determining an activated UE with an IMSI not presented in the IMSIs of all indoor UEs as an outdoor UE, and determining an activated UE with an IMSI presented in the IMSIs of all indoor UEs as an indoor UE.

4. The method according to claim 1, wherein the determining periodically whether an RSRQ value corresponding to a UE with worst channel quality in a serving cell is less than a preset RSRQ threshold comprises:
   collecting periodically RSRQ values of UEs in the serving cell to acquire the RSRQ value corresponding to the UE with worst channel quality; and
   determining by comparison whether the RSRQ value corresponding to the UE with worst channel quality is less than the preset RSRQ threshold.

5. An apparatus for power control, comprising:
   a processor; and
   a memory configured to store instructions executable by the processor;
   wherein the processor is configured to perform:
   acquiring a maximum Reference Signal Receiving Power RSRP value of a neighboring cell and a serving cell load;
   setting a transmission power for a small cell;
   determining periodically, when the small cell is operated with a low transmission power, whether a Reference Signal Receiving Quality RSRQ value corresponding to a User Equipment UE with worst channel quality in a serving cell is less than a preset RSRQ threshold; and
   augmenting the transmission power by a step value when the RSRQ value is less than the preset RSRQ threshold,
   wherein the processor is configured to perform the setting a transmission power for a small cell comprises:
   determining, when the maximum RSRP value of the neighboring cell is greater than or equal to a preset RSRP threshold and when the serving cell load is less than a preset cell load threshold, whether an outdoor UE is present in the serving cell; and
   setting a low transmission power for the small cell if no outdoor UE is present.

6. The apparatus according to claim 5, wherein in the setting a transmission power for a small cell, the processor is further configured to perform:
   setting a high transmission power for the small cell when the maximum RSRP value of the neighboring cell is less than the preset RSRP threshold and/or when the serving cell load is greater than or equal to the preset cell load threshold;
   and
   setting a high transmission power for the small cell if an outdoor UE is present.

7. The apparatus according to claim 6, wherein in the determining whether an outdoor UE is present in the serving cell, the processor is configured to perform:
   acquiring International Mobile Subscriber Identities IMSIs of all indoor UEs in the serving cell and IMSIs of activated UEs in the serving cell; and
   determining an activated UE with an IMSI not presented in the IMSIs of all indoor UEs as an outdoor UE, and determining an activated UE with an IMSI presented in the IMSIs of all indoor UEs as an indoor UE.

8. The apparatus according to claim 5, wherein in the determining periodically whether an RSRQ value corresponding to a UE with worst channel quality in a serving cell is less than a preset RSRQ threshold, the processor is configured to perform:

collecting periodically RSRQ values of UEs in the serving cell to acquire the RSRQ value corresponding to the UE with worst channel quality; and determining by comparison whether the RSRQ value corresponding to the UE with worst channel quality is less than the preset RSRQ threshold.

9. A non-transitory computer-readable storage medium having stored therein instructions that, when executed by a processor of a small cell, causes the small cell to perform a method for power control, the method comprising:

acquiring a maximum Reference Signal Receiving Power RSRP value of a neighboring cell and a serving cell load;

setting a transmission power for a small cell;

determining periodically, When the small cell is operated with a low transmission power, whether a Reference Signal Receiving Quality RSRQ value corresponding to a User Equipment UE with worst channel quality in a serving cell is less than a preset RSRQ threshold; and augmenting the transmission power by a step value when the RSRQ value is less than the preset RSRQ threshold, wherein the setting a transmission power for a small cell comprises:

determining, when the maximum RSRP value of the neighboring cell is greater than or equal to a preset RSRP threshold and when the serving cell load is less than a preset cell load threshold, whether an outdoor UE is present in the serving cell; and setting a low transmission power for the small cell if no outdoor UE is present.

* * * * *